United States Patent [19]
Bacon et al.

[11] Patent Number: 5,323,064
[45] Date of Patent: Jun. 21, 1994

[54] RADIO FREQUENCY SIGNAL FREQUENCY CONVERTER

[75] Inventors: Peter Bacon, Salem, N.H.; J. Bradford Cole, Chelmsford, Mass.; Yusuke Tajima, Acton, Mass.; Erick A. Olsen, Tewksbury, Mass.; Daniel L. Kaczman, Wellesley, Mass.

[73] Assignee: Raytheon Company, Lexington, Mass.

[21] Appl. No.: 53,126

[22] Filed: Apr. 26, 1993

[51] Int. Cl.$^5$ .............................................. H03L 7/00
[52] U.S. Cl. .................................... 307/271; 307/243; 307/529; 307/592; 328/15; 328/104; 328/154; 455/333
[58] Field of Search ............... 307/242, 246, 571, 271, 307/529, 592, 39, 243; 328/104, 154, 15; 455/333

[56] References Cited

U.S. PATENT DOCUMENTS

| | | | |
|---|---|---|---|
| 4,010,385 | 3/1977 | Krol | 307/243 |
| 4,044,247 | 8/1977 | Brown, Jr. | 250/199 |
| 4,658,405 | 4/1987 | Yazuka et al. | 375/39 |
| 4,715,048 | 12/1987 | Masamura | 375/100 |
| 4,716,385 | 12/1987 | Noda et al. | 375/39 |
| 4,816,767 | 3/1989 | Canon et al. | 364/571.04 |
| 4,912,339 | 3/1990 | Béchade et al. | 307/242 |
| 4,942,591 | 7/1990 | Nease et al. | 375/84 |
| 4,959,873 | 9/1990 | Flynn et al. | 455/303 |
| 4,985,703 | 1/1991 | Kaneyama | 307/243 |
| 5,157,291 | 10/1992 | Shimoda | 307/243 |
| 5,162,666 | 11/1992 | Tran | 307/243 |

Primary Examiner—Timothy P. Callahan
Assistant Examiner—Tuan T. Lam
Attorney, Agent, or Firm—Donald F. Mofford; Richard M. Sharkansky

[57] ABSTRACT

A switchable, dual channel frequency converter is provided. The converter includes a semiconductor body having formed as a monolithic microwave integrated circuit: a pair of input signal channels; a pair of output signal channels; and, a mixer and multiplexer means, disposed between the pair of input signal channels and the pair of output signal channels, for converting the frequency of signals fed to the pair of input signal channels to a different frequency and for directing the frequency converted signals to the pair of output signal channels selectively in accordance with a control signal. The mixer and multiplexer means includes: a pair of mixers coupled to the pair of input signal channels and a common local oscillator signal; and a multiplexer network. The mixers covert the radio frequency of the signals in the pair of input signal channels into a corresponding pair of intermediate frequency signal channels. The multiplexer network includes a pair of input ports fed by the pair of intermediate frequency signal channels and a pair of output ports which feed the pair of output signal channels. A control signal is fed to the multiplexer network. The power transfer of the intermediate frequency signals through the multiplexer network to the output signal channels is substantially the same (i.e., less than 0.5 db difference) independent of the state of the control signal.

13 Claims, 8 Drawing Sheets

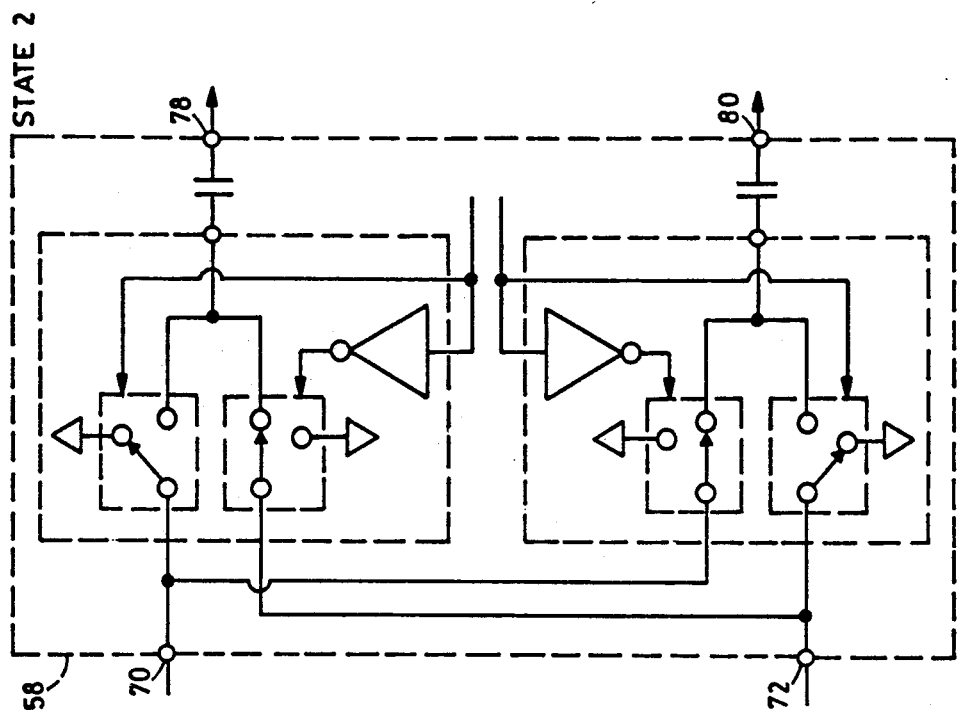
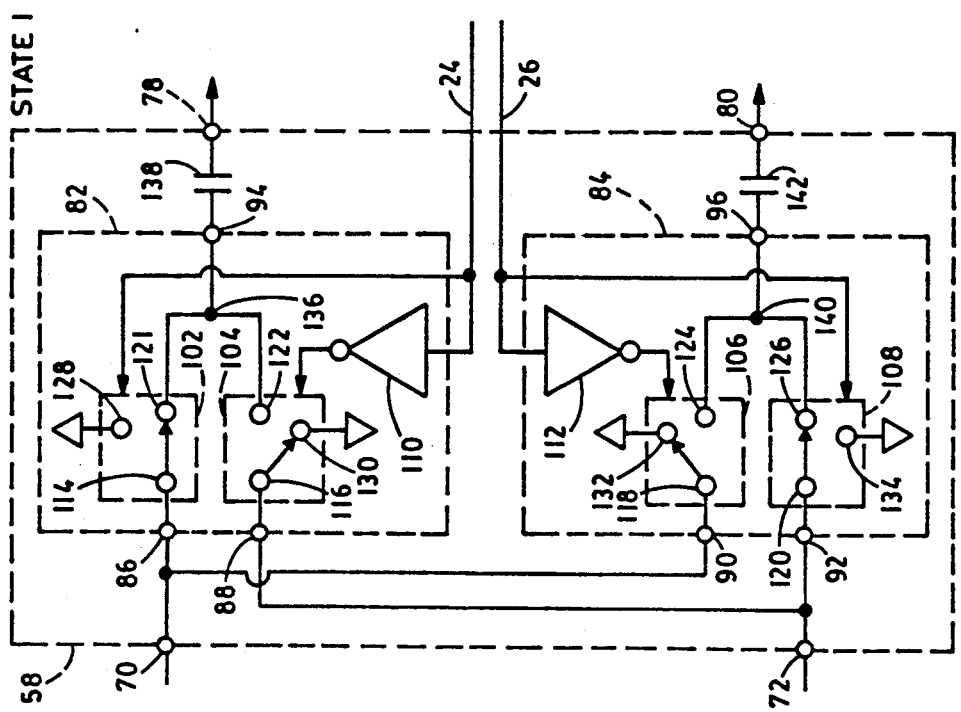
FIG. 2B
FIG. 2A

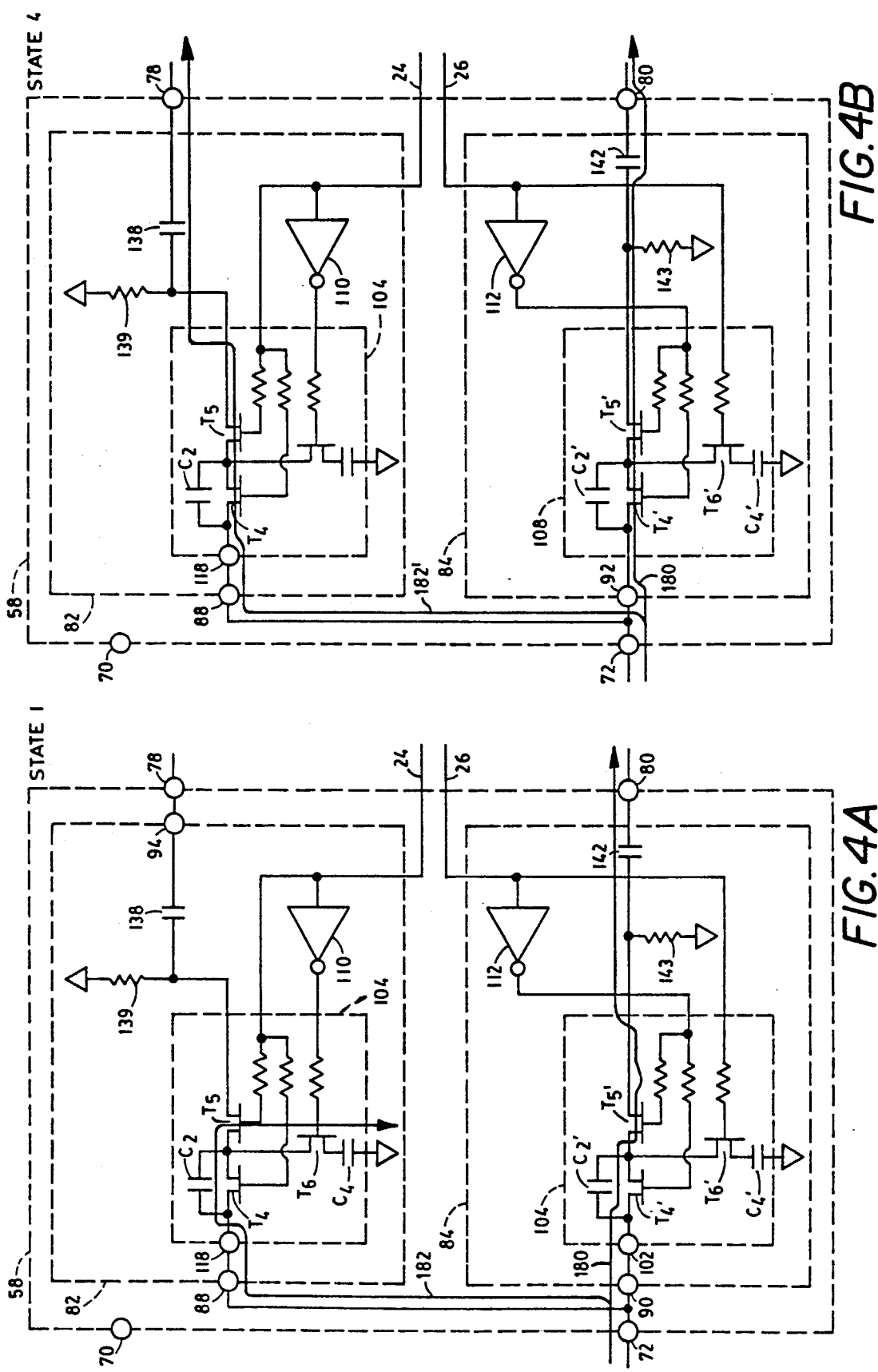

RADIO FREQUENCY SIGNAL FREQUENCY CONVERTER

BACKGROUND OF THE INVENTION

This invention relates generally to radio frequency (RF) signal frequency down converters and more particularly to dual channel RF signal frequency converters.

As is known in the art it is generally required to convert received radio frequency (RF) signals into intermediate frequency signals. In some applications, as for example direct broadcast satellite systems, in order to increase the number of signal channels within a prescribed bandwidth, information in pairs of channels share a common frequency band. The information in pairs of channels is transmitted as a composite RF signal having the common frequency band. The information in one of the pair of channels is transmitted with one type of polarization, say horizontal polarization, while the information in the other one of the pair of channels is transmitted with a different type of polarization, say vertical polarization. Thus, the number of channels within the prescribed frequency band is doubled.

It follows then, that a receiving system must, in addition to down converting the RF frequency of the received RF composite signal to an intermediate frequency, direct one polarized signal to one receiver channel and the other polarized signal to the other receiver channel.

SUMMARY OF THE INVENTION

In accordance with the present invention, a switchable, dual channel frequency converter is provided. The converter includes a semiconductor body having formed as a monolithic microwave integrated circuit: a pair of input signal channels; a pair of output signal channels; and, a mixer and multiplexer means, disposed between the pair of input signal channels and the pair of output signal channels, for converting the frequency of signals fed to the pair of input signal channels to a different frequency and for directing the frequency converted signals to the pair of output signal channels selectively in accordance with a control signal.

In a preferred embodiment of the invention, the mixer and multiplexer means includes: a pair of mixers coupled to the pair of input signal channels and a common local oscillator signal; and a multiplexer network. The mixers convert the radio frequency of the signals in the pair of input signal channels into a corresponding pair of intermediate frequency signal channels. The multiplexer network includes a pair of input ports fed by the pair of intermediate frequency signal channels and a pair of output ports which feed the pair of output signal channels.

A control signal is fed to the multiplexer network. When the control signal is in a first state, a first one of the pair of intermediate frequency signal channels is coupled to a first one of the pair of output channels, while a second one of the pair of intermediate frequency signal channels is coupled to a second one of the pair of output channels. When the control signal is in a second state, the first one of the pair of intermediate frequency signal channels is coupled to the second output channel, while the second intermediate frequency signal channel is coupled to the first output channel. When the control signal is in a third state, the first intermediate frequency signal channel is coupled to the first output channel and is also coupled to the second output channel, while the second input channel is decoupled from both the first and second output channels. When the control signal is in a fourth state, the first intermediate frequency signal channel is decoupled from both the first and second output channels, while the second intermediate frequency signal channel is coupled to the first output channel and is also coupled to the second output signal channel. The power transfer of the intermediate frequency signals through the multiplexer network to the output signal channels is substantially the same (i.e., less than 0.5 db difference) in all four states of the control signal. With such arrangement, the dual channel, switchable frequency converter provides uniform power transfer between the input signal channels and the output signal channels in all four states of the control signal.

In a preferred embodiment, the multiplexer network includes a pair of multiplexers. Each one of the pair of multiplexer includes a pair of inputs and an output. Each input port of the multiplexer network is coupled to one of the pair of inputs of each of the pair of multiplexers. The outputs of the pair of multiplexers are coupled to a corresponding one of the pair of output ports of the multiplexer network. When the control signal is in a first state, a first one of the pair of intermediate frequency signal channels is coupled to a first one of the pair of output channels through a first one of the pair of multiplexers, while a second one of the pair of intermediate frequency signal channels is coupled to a second one of the pair of output channels through a second one of the pair of multiplexer systems. When the control signal is in a second state, the first one of the pair of intermediate frequency signal channels is coupled to the second output channel through the second multiplexer, while the second intermediate frequency signal channel is coupled to the first output channel through the first multiplexer. When the control signal is in a third state, the first intermediate frequency signal channel is coupled to the first output channel through the first multiplexer and is also coupled to the second output channel through the second multiplexer, while the second input channel is decoupled from both the first and second output channels. When the control signal is in a fourth state, the first intermediate frequency signal channel is decoupled from both the first and second output channels, while the second intermediate frequency signal channel is coupled to the first output channel through the first multiplexer and is also coupled to the second output signal channel through the second multiplexer system.

In accordance with an additional feature of the invention, each one of the multiplexers includes a pair of transistor switching networks. The pair of switching networks has input terminals fed by the pair of mixers, a ground terminal, and a pair of output terminals connected in common to one of the pair of output channels. In each one of the four states of the control signal, when one of the pair of switching networks decouples the input terminal from ground terminal and couples such input terminal to the output channel, the other one of the pair of switching networks decouples the input terminal from the output channel and couples such input terminal to the ground terminal.

In a preferred embodiment, each one of the transistor switching networks includes a pair of field effect transistors. One of the transistors has its source and drain electrodes coupled serially between the input terminal and the output terminal and the other one its source and drain electrode serially coupled between the input terminal and the ground terminal. A capacitor is connected in shunt with the source and drain electrodes of the first mentioned transistor. The gate electrodes are coupled to the control signal and, for each one of the four states of the control signal, one of the pair of transistors is driven toward a conducting state and the other is driven toward a non-conducting state. In a preferred embodiment, a third field effect transistor is included. One of the source and drain electrodes of each of the pair of transistors are connected at a junction. The source and drain electrodes of the third transistor are serially connected between the junction and the output of the output terminal.

BRIEF DESCRIPTION OF THE DRAWINGS

For a more complete understanding of the concepts of the invention, reference is now made to the following drawings, in which:

FIGS. 2A-2D are simplified schematic diagrams showing the conditions of a multiplexer network used in the converter of FIG. 1 in response to four states of a control signal;

FIGS. 4A and 4B are schematic diagram of a portion of the multiplexer network of FIG. 3; FIG. 4A showing path of one of a pair of intermediate frequency signals in the converter of FIG. 1 when the multiplexer network is in the state shown in FIG. 2A and of FIG. 4B showing path of such one of the pair of intermediate frequency signals when the multiplexer network is in the state shown in FIG. 2D;

DESCRIPTION OF THE PREFERRED EMBODIMENT

Figure 1:
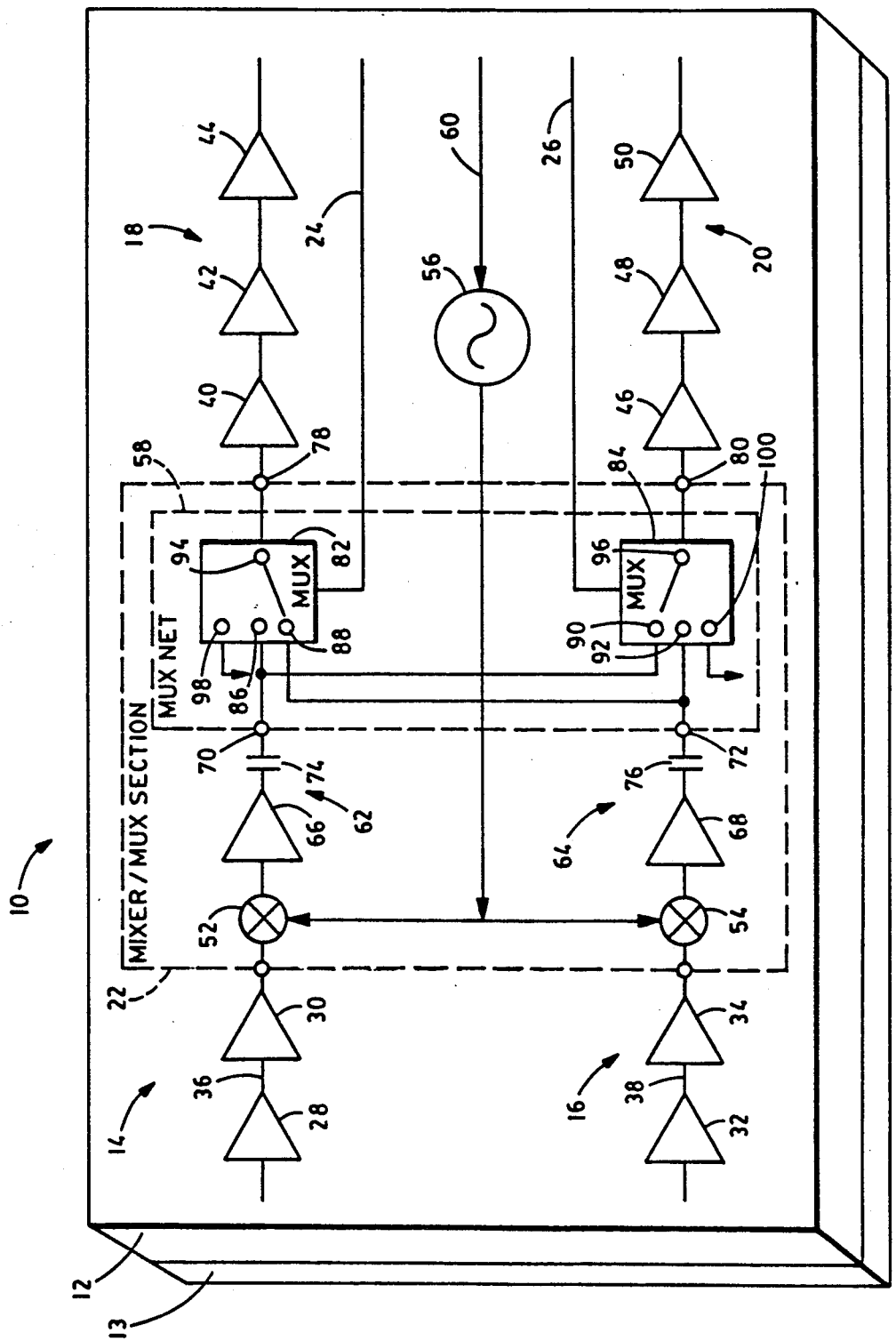
FIG. 1 is a schematic diagram of a switchable, dual channel switchable frequency converter in accordance with the invention.

Referring now to FIG. 1 a switchable, dual channel frequency converter 10 is shown. The converter 10 includes a semiconductor body 12, here GaAs, having formed as a monolithic microwave integrated circuit: a pair of input, radio frequency signal channels 14, 16; a pair of output signal channels 18, 20; and, a mixer and multiplexer section 22, disposed between the pair of input signal channels 14, 16 and the pair of output signal channels 18, 20, as shown, for converting the frequency of signals fed to the pair of input signal channels 14, 16 to a different frequency and for directing the frequency converted signals to the pair of output signal channels 18, 20 selectively in accordance with a control signal on lines 24, 26.

More particularly, the pair of input signal channels 14, 16 are radio frequency (RF) signals, here signals in the frequency band 11.0 to 11.7 GHz, fed by a dual polarized antenna, not shown. The pair of input signal channels 14, 16 include a pair of serially connected low noise RF amplifiers 28, 30 and 32, 34, respectively, as shown. Each one of the low noise RF amplifiers 28, 30, 32, 34 are identical in construction and are here conventional field effect transistor amplifiers formed in active regions, not shown, of the semiconductor body 12. The amplifiers 28, 30, 32, 34, as well as the other components to be described hereinafter formed in the body 12, are interconnected by conventional microstrip transmission lines 36, 38. Thus, each one of the microstrip transmission lines used in the converter 10 includes a strip conductor formed on, or over, the upper surface of the semiconductor body 12, a ground plane conductor 13, formed over the bottom surface of the semiconductor body 12 and separated from the strip conductor by a dielectric, here the inactive portion of the semiconductor body 12.

The pair of output signal channels 18, 20 include a pair of serially connected intermediate frequency amplifiers 40, 42, 44 and 46, 48, 50, respectively, as shown. Each one of the intermediate frequency amplifiers 40, 42, 44 and 46, 48, 50 are identical in construction and will be described in detail in connection with FIG. 5. Suffice it to say here that such amplifiers 40-50 are formed in active regions, not shown, of the semiconductor body 12. Here the intermediate frequency signals fed through the amplifiers 40 to 50 are in the band 1.0 to 1.7 GHz.

The mixer and multiplexer section 22 includes: a pair of mixers 52, 54 coupled to the pair of input signal channels 14, 16 and a common local oscillator signal provided by an oscillator circuit 56, also formed in active regions in the semiconductor body 12; and a multiplexer network 58. (The oscillator 56 is fed, via line 60, from a conventional dielectric resonator, not shown, located external to the semiconductor body 12). The outputs of mixers 52, 54 translates the frequency of the radio frequency signal in the pair of input signal channels 14, 16 to an intermediate frequency, here in the band of 1.0-1.7 GHz. Thus, the outputs of the mixers 52, 54 provide a pair of intermediate frequency signals in intermediate frequency signal channels 62, 64, respectively.

Disposed in the intermediate frequency signal channels 62, 64 are a pair of intermediate frequency (IF) amplifiers 66, 68. The IF amplifiers 66, 68 are of the same type as IF amplifiers 40-50 to be described in detail in connection with FIG. 5. The multiplexer network 58 includes a pair of input ports 70, 72 fed by the pair of intermediate frequency signal channels 62, 64, respectively, as shown. More particularly, the outputs of mixers 52, 54 are coupled to the input ports 70, 72 via IF amplifiers 66, 68 and dc blocking capacitors 74, 76, respectively, as shown. The multiplexer network 58 has a pair of output ports 78, 80 which feed the pair of output signal channels 18, 20.

Figure 2D:
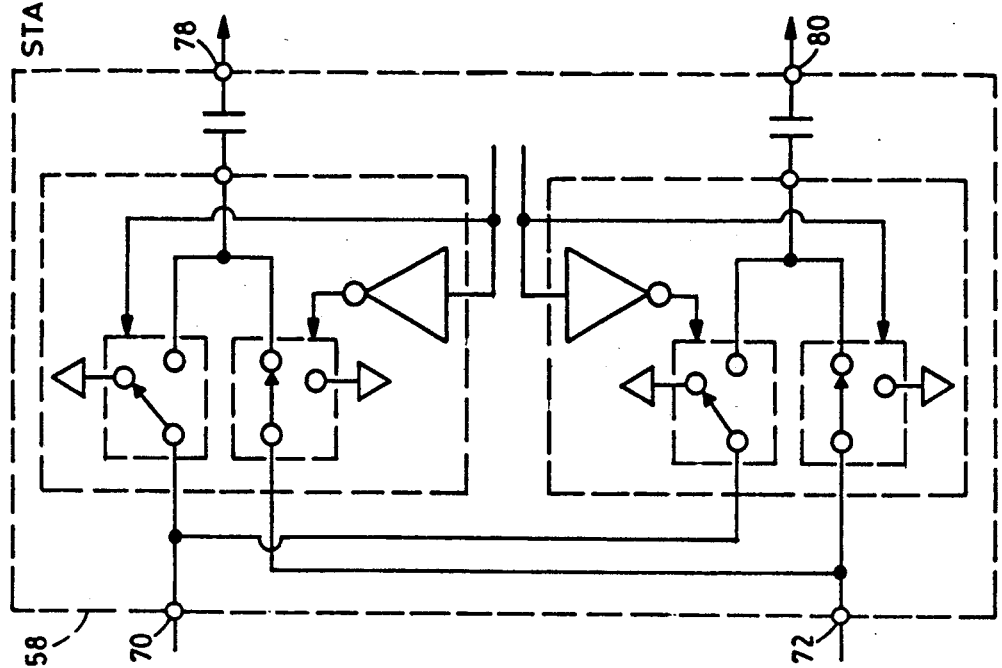
Figure 2C:
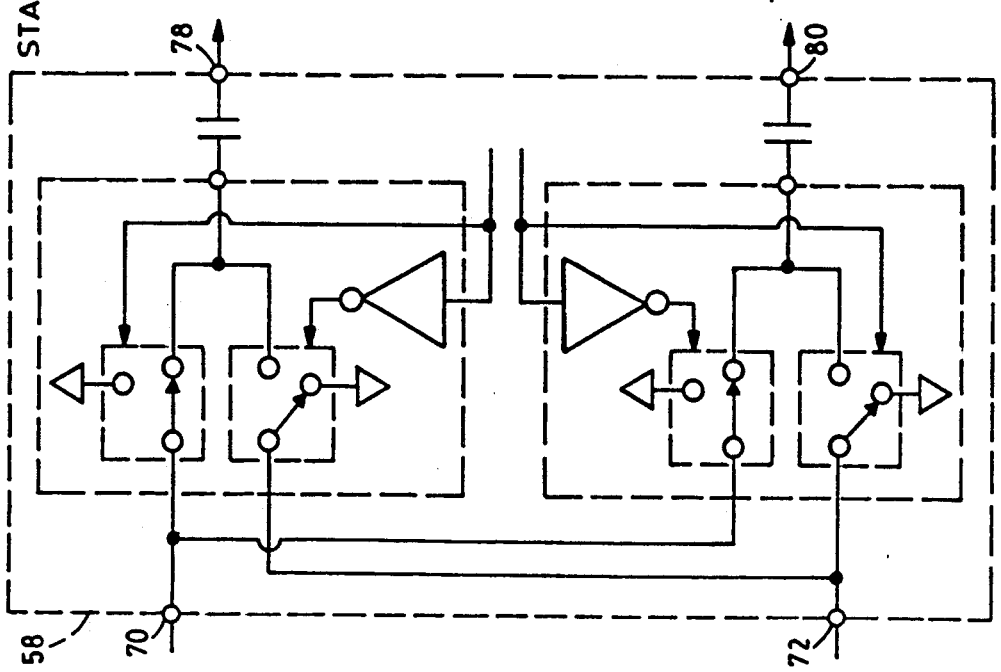

A control signal is fed to the multiplexer network 58 via lines 24, 26. Referring also to FIG. 2A, when the control signal is in a first state, intermediate frequency signal channel 62 is coupled to output channel 18, while intermediate frequency signal channel 64 is coupled to output channel 20. Referring to FIG. 2B, when the control signal is in a second state, the intermediate frequency signal channel 62 is coupled to output channel 20, while the intermediate frequency signal channel 64 is coupled to the output channel 18. Referring to FIG. 2C, when the control signal is in a third state, the intermediate frequency signal channel 62 is coupled to the both output channels 18 and 20, while the intermediate frequency signal channel 64 is decoupled from both output channels 18, 20. Referring to FIG. 2D, when the control signal is in a fourth state, the intermediate frequency signal channel 62 is decoupled from both output channels 18, 20, while the intermediate frequency signal channel 64 is coupled to the both output signal channels 18, 20. The power transfer of the intermediate frequency signals between the input ports 70, 72 of the multiplexer network 58 and the output ports 78, 80 of such network 58 is substantially the same (i.e., less than 0.5 db difference) for all four states of the control signal. With such arrangement, the dual channel, switchable frequency converter provides uniform power transfer between the input signal channels and the output signal channels in all four states of the control signal.

Figure 3:
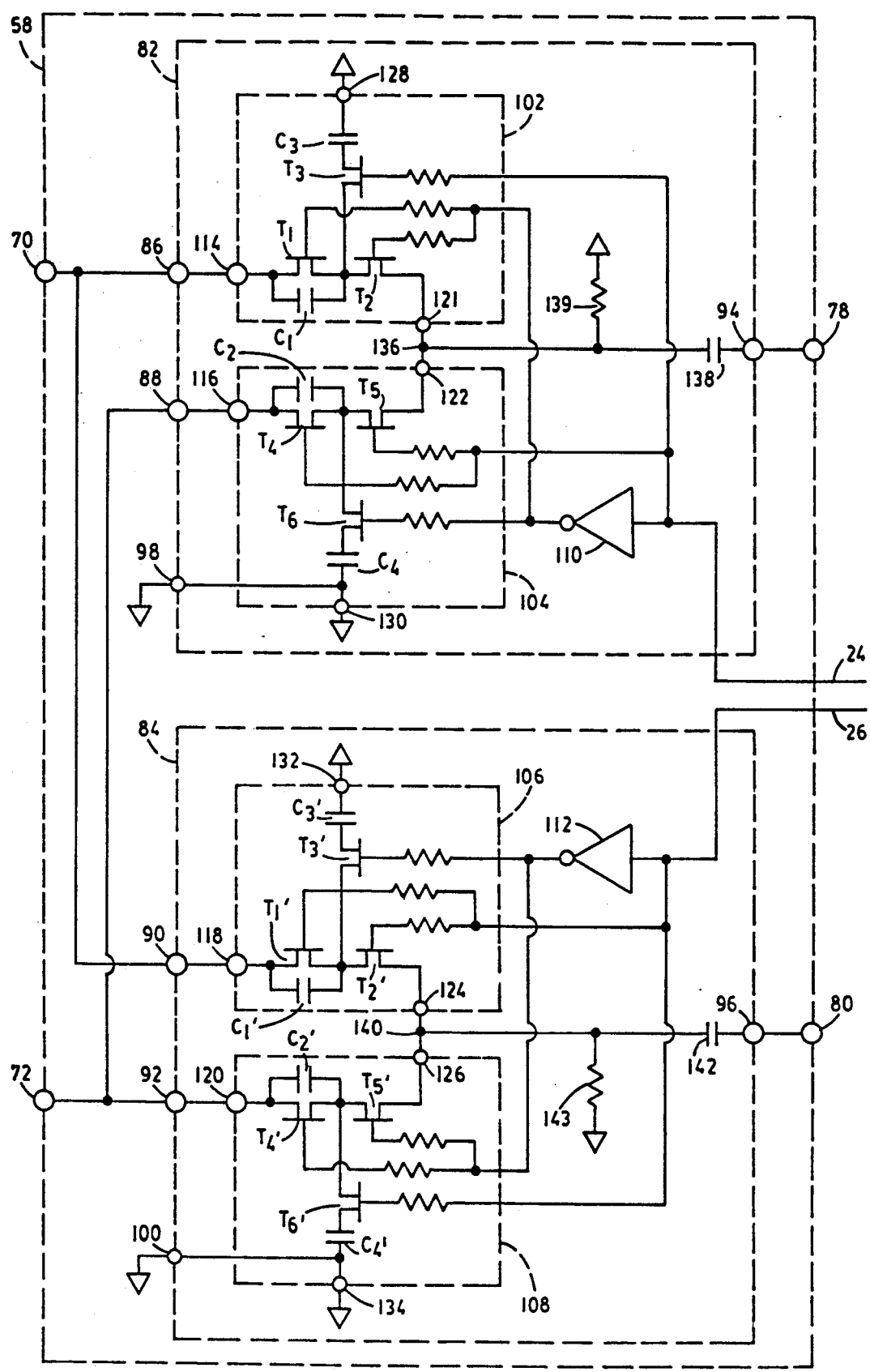
FIG. 3 is a schematic diagram of the multiplexer network used in the switchable, dual channel frequency converter of FIG. 1.

Referring now also to FIG. 3, multiplexer network 58 includes a pair of multiplexers 82, 84, as shown. Each one of the pair of multiplexers 82, 84 includes a pair of inputs 86, 88 and 90, 92, respectively, as shown, an output 94, 96, respectively, as shown, and a grounded terminal 98, 100, respectively.

Referring again to FIG. 1, the output of each one of the mixers 52, 54 is coupled to one of the pair of inputs 86, 88, 90, 92 of the multiplexers 82, 84, through intermediate frequency amplifiers 66, 68 and dc blocking capacitors 74, 76, as shown. The outputs 94, 96 of the pair of multiplexers 82, 84 are coupled to the inputs of the pair of output signal channels 18, 20, respectively. The control signal on lines 24, 26 are fed to the pair of multiplexers 82, 84. When the control signal is in a first state, (here when a logic 0 signal is on line 24 and a logic 0 signal is on line 26) a first one of the pair of input channels 14, 16, here input channel 14, is coupled to a first one of the pair of output channels, 18, 20, here output channel 18 through a first one of the pair of mixers, 52, 54, here mixer 52, through amplifier 66, capacitor 74, and a first one of the pair of multiplexers 82, 84, here multiplexer 82, while the second input channel 16 is coupled to the second output channel 20 through the second mixer 54, amplifier 68, capacitor 76, and the second multiplexer 84. When the control signal is in a second state (here when a logic 1 signal is on both lines 24 and 26) the first input channel 14 is coupled to the second output channel 20 through the first mixer 52, amplifier 66, capacitor 74, and the second multiplexer 84, while the second input channel 16 is coupled to the first output channel 18 through the second mixer 54, amplifier 68, capacitor 76, and the first multiplexer 82. When the control signal is in a third state (here when the logic signal on line 24 is 0 and a logic 1 signal is on line 26) the first input channel 14 is coupled to the first output channel 18 through the first mixer 52, amplifier 66, capacitor 74, and the first multiplexer 82 and is also coupled to the second output channel 20 through the first mixer 52, amplifier 66, capacitor 74, and the second multiplexer 84, while the second input channel 16 is decoupled from both the first and second output channels 18, 20. When the control signal is in a fourth state, (here when a logic 1 signal is on line 24 and a logic 0 signal is on line 26) the first input channel 14 is decoupled from both of the output channels, 18, 20, while the second input channel 16 is coupled to the first output channel 18 through the second mixer 54, amplifiers 68, capacitor 76, and the first multiplexer 82 and is also coupled to the second output signal channel 20 through the second mixer 54, amplifier 68, capacitor 76, and the second multiplexer 84.

Referring now to FIG. 3, each one of the multiplexers 82, 84 is shown to include a pair of identical transistor switching networks 102, 104, 106, 108, respectively, as shown. The true complement of the logic state of the signal on lines 24, 26 also are available for the switching networks 102, 104, 106, 108 by inverters 110, 112, such inverters also being formed in active regions of the semiconductor body 12 (FIG. 1). Each one of the switching networks 102, 104, 106, 108 has input terminals 114, 116, 118, 120, respectively, as shown, connected to input terminals 86, 88, 90, 92 of multiplexers 82, 84, as well as output terminals 121, 122, 124, 126, respectively, as shown, and ground terminals 128, 130, 132 and 134. Input signal channel 14 is coupled, via mixer 52 (FIG. 1), to the input terminals 114, 118, respectively, of switching networks 102, 106, respectively, as shown, and input signal channel 16 is coupled, via mixer 54, to input terminals 116, 120, respectively, of switching networks 104, 108, respectively, as shown. The output terminals 121, 122 of switching networks 102, 104, are connected, in common at terminal 136 and then to the first output signal channel 18 through a capacitor 138 (here 3.0 pf) and the output port 78 of multiplexer network 58, as shown. A dc bias resistor 139, here 1.3 k ohms is connected between terminal 136 and ground, as shown. Likewise, output terminals 124, 126 of switching networks 106, 108 are connected, in common, to the second output signal channel 20, as shown, via terminal 140, capacitor 142 (here 3.0 pf), and output port 80 of multiplexer network 58, as shown. A dc bias resistor 143, here 1.3 k ohms is connected between terminal 140 and ground, as shown. Each one of the switching networks 102, 104, 106, 108 is responsive to the control signal on lines 24, 26. It is noted that resistors 139 and 143 will not draw current because blocking capacitors $C_3$, $C_4$, $C_3'$, $C_4'$, 74, 76 (FIG. 1), 138, 142 prevent the flow of current to ground.

When the logic signal on line 24 is 0, metal electrode semiconductor transistors (MESFETs) $T_3$, $T_4$, $T_5$, are driven to a non-conducting condition while MESFETs $T_1$, $T_2$, and $T_6$ are driven to a conducting condition because of inverter 110. When the logic signal on line 24 is 1, MESFETs $T_1$, $T_2$, $T_6$, are driven to a non-conducting condition while MESFETs $T_4$, $T_5$, and $T_3$, are driven to a conducting condition. When the logic signal on line 26 is 0, metal electrode semiconductor transistors (MESFETs) $T_1'$, $T_2'$, $T_6'$, are driven to a non-conducting condition while MESFETs $T_3'$, $T_4'$, and $T_5'$ are driven to a conducting condition because of inverter 112. When the logic signal on line 26 is 1, MESFETs $T_3'$, $T_4'$, $T_5'$, are driven to a non-conducting condition while MESFETs $T_1'$, $T_2'$, and $T_6'$ are driven to a conducting condition.

Each one of the transistor switching networks 102, 104, 106, 108 is identical in construction. Switching network 102 includes the pair of metal electrode field effect transistors $T_1$, $T_3$ formed in the active region of the semiconductor body 12. Transistor $T_1$ has its source and drain electrodes coupled serially between the input terminal 114 and the output terminal 78. A capacitor $C_1$, here 0.13 picofarads, is connected across the source and drain electrodes of transistor $T_1$. Transistor $T_3$ has its source and drain electrodes serially coupled, via transistor $T_1$ and shunt capacitor $C_1$, between the input terminal 114 and the ground terminal 128 via capacitor $C_3$, here 0.5 picofarads (pf). The gate electrode of transistor $T_3$ is coupled to line 24, and the gate electrode of transistor $T_1$ is coupled to the output of inverter 110. Thus, for each one of the two logic states on line 24, one of the pair of transistors $T_1$, $T_3$ is driven toward a conducting state and the other one of the transistors $T_1$, $T_3$ is driven toward a non-conducting state. Here, a third field effect transistor $T_2$ is included to increase the isolation between ports 72 and 78 when transistors $T_1$ and $T_2$ are in the non-conducting condition.

Likewise, switching network 104 includes the pair of metal electrode semiconductor field effect transistors $T_4$, $T_6$ formed in the active region of the semiconductor body 12. Transistor $T_4$ has its source and drain electrodes coupled serially between the input terminal 116 and the output terminal 78. A capacitor $C_2$, here 0.13 picofarads, is connected across the source and drain electrodes of transistor $T_4$. Transistor $T_6$ has its source and drain electrodes serially coupled, via transistor $T_4$ and shunt capacitor $C_2$, between the input terminal 116 and the ground terminal 130 via capacitor $C_4$, here 0.5 pf. The gate electrode of transistor $T_4$ is coupled to line 24, and the gate electrode of transistor $T_6$ is coupled to the output of inverter 110. Thus, for each one of the two logic states on line 24, one of the pair of transistors $T_4$, $T_6$ is driven toward a conducting state and the other one of the transistors $T_4$, $T_6$ is driven toward a non-conducting state. Here, a third field effect transistor $T_5$ is included to increase the isolation between port 72 and 78 when the transistors $T_4$ and $T_5$ are in the non-conducting condition. One of the source and drain electrodes of each of the pair of transistors $T_4$, $T_6$ is connected at common terminal 136. Here, the drain electrode of transistor $T_2$ is connected to the source electrode of transistor $T_5$ at common terminal 136. Also, the transistors $T_2$ and $T_5$ isolate terminal 136 from ground through a low impedance path provided when either transistor $T_3$ or transistor $T_6$ is in a conducting condition.

Switching networks 106, 108 are substantially the same as switching networks 102, 104 and elements equivalent to elements $T_1$, $T_2$, $T_3$, $T_4$, $T_5$, $T_6$, $C_1$, $C_2$, $C_3$, $C_4$, are designated by the same numeral with a prime (') notation, (i.e., as elements $T_1'$, $T_2'$, $T_3'$, $T_4'$, $T_5'$, $T_6'$, $C_1'$, $C_2'$, $C_3'$, $C_4'$, respectively, as shown).

Figure 5A:
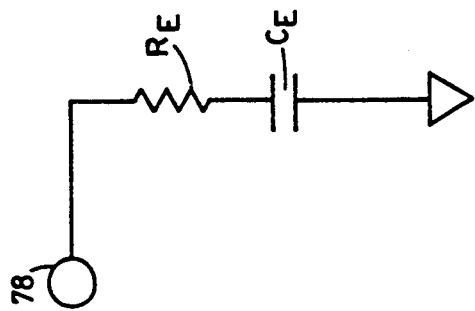
FIG. 5A is the equivalent circuit of the input impedance of the amplifier.
Figure 5:
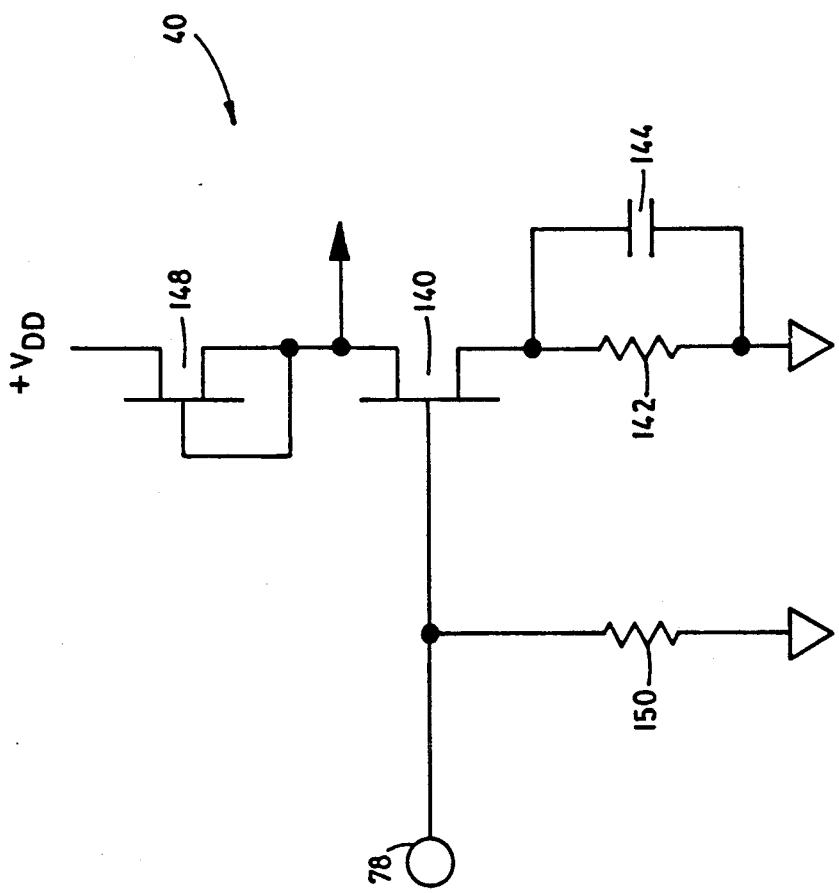
FIG. 5 is a schematic diagram of an intermediate frequency amplifier used in the frequency converter of FIG. 1

A schematic of an exemplary one of the intermediate frequency amplifiers 40, 42, 44, 46, 48, 50, 66, 68, here amplifier 40 is shown in detail in FIG. 5. As shown, the amplifier 40 includes a metal electrode semiconductor field effect transistor (MESFET) 140. Transistor 140 has a gate periphery of here, 90 microns. The transistor 140 has its source electrode coupled to ground through a resistor 142, here 318 ohms, and shunt connected capacitor 144, here 4 picofarads (pf). The drain electrode of transistor 140 is connected to a power supply $+V_{DD}$ through an active load 148, as shown. Here the gate periphery of the transistor used to form the active load 148 is 30 microns. The gate electrode of transistor 140 provides the input to the output signal channel 18 and is coupled to ground through a resistor 150, here 2k ohms. Resistor 150 has a relative high value, here 2K ohms. The input impedance to IF amplifier 40 may be represented as a resistor $R_E$, here 239 ohms, in series with a capacitor $C_E$, here 0.106 picofarads (pf) as shown in FIG. 5A.

Figure 6A:
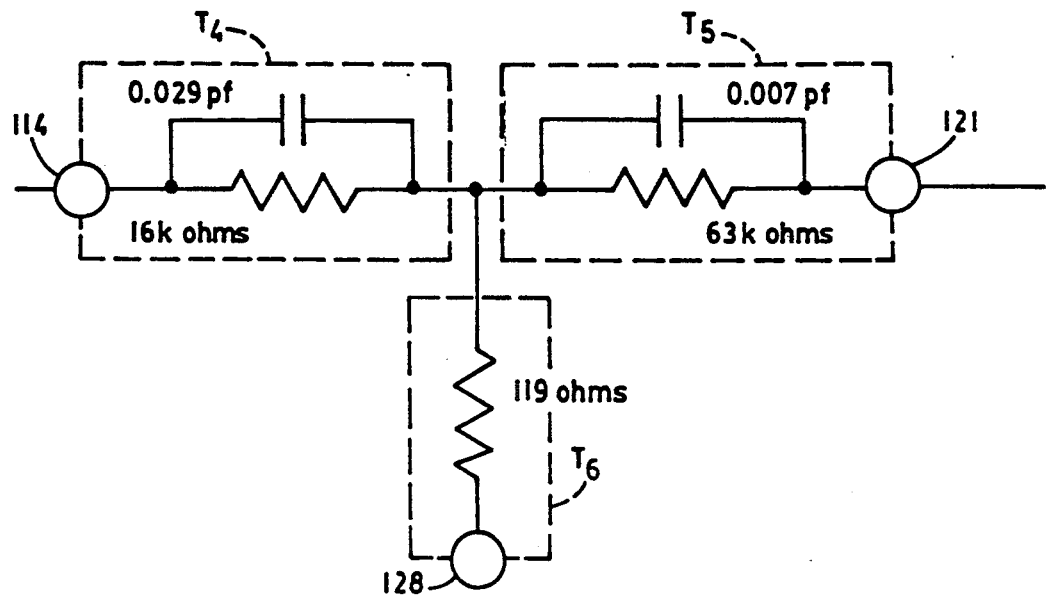
FIGS. 6A and 6B are equivalent circuits of a switching network used in the converter of FIG. 1 in two different operating conditions, respectively; and, FIG. 7 is a switching network, adapted for use in the converter of FIG. 1, in accordance with an alternative embodiment of the invention.
Figure 6B:
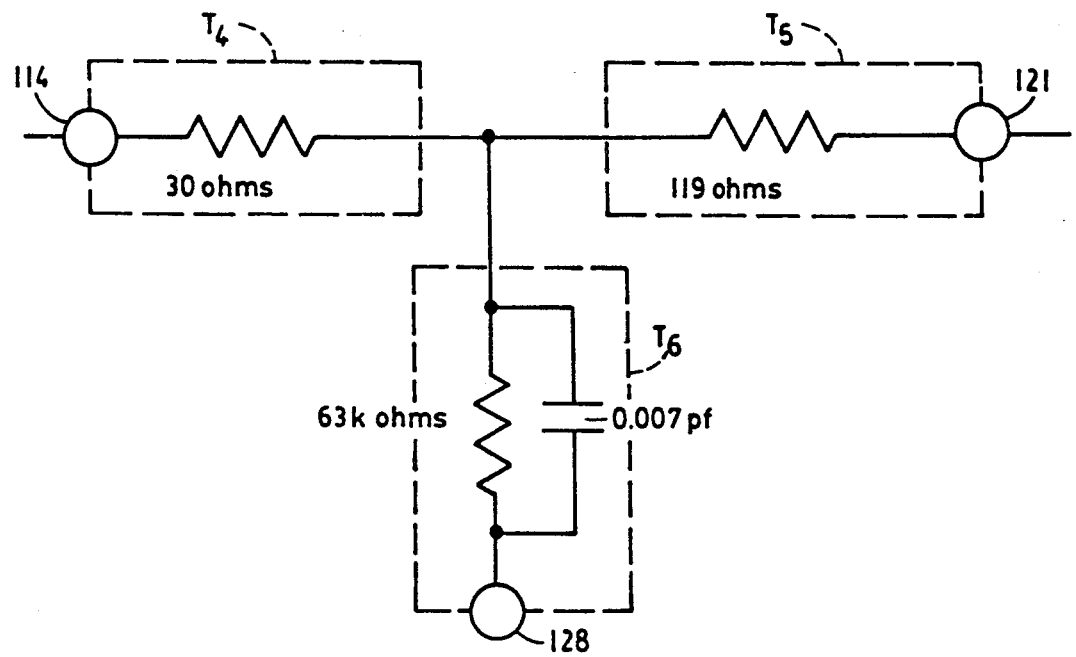

Referring now to FIGS. 6A and 6B, equivalent circuits of an exemplary one of the switching networks 102, 104, 106, 108, here switching network 104. Here transistors $T_5$ and $T_6$ each have a gate periphery of 20 microns and transistor $T_4$ has a gate periphery of 80 microns. FIG. 6A is the equivalent circuit of switching network 104 when transistors $T_4$ and $T_5$ are in the non-conducting condition and transistor $T_6$ is in the conducting condition. Here when transistor $T_4$ is in the non-conducting condition it is represented by a capacitor of 0.029 pf in parallel with a resistor of 16 k ohms, as shown. Here when transistor $T_5$ is in the non-conducting condition it is represented by a capacitor of 0.007 pf in parallel with a resistor of 63 k ohms, as shown. Here when transistor $T_6$ is in the conducting condition it is represented by a resistor of 119 ohms, as shown. FIG. 6B is the equivalent circuit when transistors $T_4$ and $T_5$ are in the conducting condition and transistor $T_6$ is in the non-conducting condition. Here when transistor $T_4$ is in the conducting condition it is represented by a resistor of 30 ohms, as shown. Here when transistor $T_5$ is in the conducting condition it is represented by a resistor of 119 ohms, as shown. Here when transistor $T_6$ is in the non-conducting condition it is represented by a resistor of 63 k ohms in parallel with a capacitor of 0.007 pf, as shown.

As discussed above, in connection with FIGS. 1 and 2: when the control signal is in a first state, intermediate frequency signal channel 62 is coupled to output channel 18, while intermediate frequency signal channel 64 is coupled to output channel 20; when the control signal is in a second state, the intermediate frequency signal channel 62 is coupled to output channel 20, while the intermediate frequency signal channel 64 is coupled to the output channel 18; when the control signal is in a third state, the intermediate frequency signal channel 62 is coupled to the both output channels 18 and 20, while the intermediate frequency signal channel 64 is decoupled from both output channels 18, 20; and, when the control signal is in a fourth state, the intermediate frequency signal channel 62 is decoupled from both output channels 18, 20, while the intermediate frequency signal channel 64 is coupled to the both output signal channels 18, 20. The power transfer of the intermediate frequency signals between the input ports 70, 72 of the multiplexer network 58 and the output ports 78, 80 of such network 58 is substantially the same (i.e., less than 0.5 db difference) for all four states of the control signal.

To understand the basic mechanism which enables this control signal state - power transfer characteristic, the operation of the multiplexer network 58, consider, for example, the signal at input port 72 in state 1 and state 4, discussed in connection with FIGS. 2A and 2D, respectively. The operation of multiplexer network 58 on the signal at input port 72 in states 1 and 4 has been represented, in simplified form, in FIGS. 4A and 4B, respectively. It is first noted that in state 1 (FIG. 4A), the signal at input port 72 passes to output port 80 along a path indicated by arrow 180 (i.e., through conducting transistors $T_4'$, $T_5'$, capacitor 142 to output port 80), while such signal at input port 72 is decoupled from output port 78. More particularly, instead of being coupled to output port 78, the signal at input port 72 is directed to ground along a path indicated by arrow 182 (i.e., around non-conducting transistor $T_4$ via shunt connected capacitor $C_2$, through conducting transistor $T_6$, and capacitor $C_4$, to ground).

It is next noted that in state 4 (FIG. 4B), the signal at input port 72 again passes to output port 80 along the path indicated by arrow 180 (i.e., through conducting transistors $T_4'$, $T_5'$, capacitor 142 to output port 80), while such signal at input port 72 is now also decoupled from ground and is coupled to output port 78. More particularly, instead of being coupled to ground via transistor $T_6$ and capacitor $C_4$, the signal at input port 72 is directed to output port 78 along a path indicated by arrow 182' (i.e., through conducting transistors $T_4$ and $T_5$ and capacitor 138).

The shunt capacitor $C_2$ is used to maintain constant power transfer to the output signal channels in both state 1 and 4. More particularly, as shown in FIGS. 4A and 4B, the multiplexer network 58 can be considered as a single input port, two output port network having an input port 72 and a pair of output ports 78, 80. The relationship between the input port 72 and the output port 80 can be represented by the following matrix, as follows:

$$\begin{bmatrix} S_{11} & S_{21} \\ S_{12} & S_{22} \end{bmatrix}$$

where: $S_{11}$ is the reflection coefficient to the signal at input port 72; $S_{21}$ is the transmission coefficient to output port 80 from input port 72; $S_{12}$ is the transmission coefficient to input port 72 from output port 80; and, $S_{22}$ is the refection coefficient to a signal at output port 80. Due to the identical paths between ports 72 and 78 in state 4, $S_{21}'$ between ports 72 and 78 will equal $S_{21}'$ between ports 72 and 80; where $S_{21}'$ is the effective power transfer from IF amplifier 68 (FIG. 1) through multiplexer section 84 to the IF amplifier 46. The following analysis focuses on maintaining $S_{21}'$ between ports 72 and 80 the same for both state 1 and state 4. Thus, as discussed on page 35 of a book entitled *Solid State Microwave Design* by Tri T. Ha, published by Wiley, 1991:

$$G = |S_{21}'|^2 = \frac{|S_{21}|^2 (1 - |\Gamma_S|^2)(1 - |\Gamma_L|^2)}{|(1 - \Gamma_S S_{11})(1 - \Gamma_L S_{22}) - \Gamma_S \Gamma_L S_{12} S_{21}|^2}$$

where $\Gamma_S$ and $\Gamma_L$ are defined below.

In order to have the same power transfer between input port 72 and output port 80 during state 1 and state 4, G must be the same for both state 1 and state 4. The output impedance of IF amplifier 68 FIG. 1), including the effect of capacitor 76 is $Z_S$, and the input impedance of IF amplifiers 40, 46 is $Z_L$. Here, $Z_S = (622 - j\,336)$ ohms (where $j = \sqrt{-1}$). Thus, because;

$$\Gamma_S = \frac{z_S - z_O}{Z_S + z_O}$$

where $Z_O$ is the characteristic impedance, here 50 ohms. Thus, here $\Gamma_S = 0.883 \angle -3.86°$. Here $Z_L = (239 - j\,1200)$ ohms. Thus, because;

$$\Gamma_L = \frac{z_L - z_O}{Z_L + z_O}$$

where $Z_O$ is the characteristic impedance, here 50 ohms. Thus, here $\Gamma_L = 0.983 \angle -4.75°$. It is also noted that $S_{22}$ remains the same in both states 1 and 4 because there is always one open path (i.e., the signal at input port 70 is decoupled from output port 80) and one closed path to port 80 (i.e., a path from input port 72 to output port 80). Here the impedance at output port $S_{22}$ at a frequency of 1.25 GHz is:

State 1: $.651 \angle -11.4° = (195 - j\,87.6)$;
State 4: $.650 \angle -11.4° = (195 - j\,87.6)$.

Because $S_{22}$, $\Gamma_S$, and $\Gamma_L$ do not change whether in state 1 or state 4, the only variables in the equations set forth above are $S_{21}$, $S_{12}$, and $S_{11}$. $S_{12}$ and $S_{21}$ are equivalent, because the network is passive and not active. $S_{21}$, and therefore $S_{12}$, will be different, absent capacitor $C_2$, $C_2'$ (FIGS. 4A and 4B), in state 1 and state 4. Here, absent $C_2$, $C_2'$ the magnitude (M) and phase (P), in degrees, of $S_{11}$, $S_{21}$, $S_{12}$, and $S_{22}$ are as follows:

|  | $MS_{11}$ | $PS_{11}$ | $MS_{21}$ | $PS_{21}$ | $MS_{12}$ | $PS_{12}$ | $MS_{22}$ | $PS_{22}$ |
|---|---|---|---|---|---|---|---|---|
| State 1 | .6557 | −12.012 | .37225 | 18.0046 | .37225 | 18.0096 | .65321 | −11.0 |
| State 4 | .6605 | −15.384 | .3623 | 16.796 | .3623 | 16.796 | .65003 | −11.29 |

Thus, without capacitors $C_2$, $C_2'$ the gain between output 80 and input port 72 in state 1 is −8.933 db; and the gain between output port 80 and input port 72 in state 4 is −11.042 db. To compensate for this 2.109 db difference in gain, capacitors $C_2$, $C_2'$ are connected in shunt with transistors $T_4$, $T_4'$, as shown. These capacitors are used primarily to change $S_{11}$ of the multiplexer network 58 and secondarily to decrease $S_{12}$ and $S_{21}$. Using a value of 0.13 pf for capacitors $C_2$, $C_2'$ results in the following:

|  | $MS_{11}$ | $PS_{11}$ | $MS_{21}$ | $PS_{21}$ | $MS_{12}$ | $PS_{12}$ | $MS_{22}$ | $PS_{22}$ |
|---|---|---|---|---|---|---|---|---|
| State 1 | .6688 | −15.99 | .363 | 16.65 | .363 | 16.65 | .651 | −11.44 |
| State 4 | .6614 | −15.45 | .362 | 16.99 | .362 | 16.99 | .651 | −11.38 |

Thus, the gain, or power transfer between output port 80 and input port 72 differs by 0.039 db from state 1 and state 4. The distribution in gain constancy improvement due to the capacitors $C_2$, $C_2'$ are as follows: due to $S_{12}$ and $S_{21}$ is 0.425 db and due to $S_{11}$ is 1.640 db at a frequency of 1.25 GHz.

It is noted that the analysis presented above applies equally in the other two states 2 and 3 and also applies to the signal at input port 70 as well as it did to the signal at input port 72. That is, state 1 is electrically the same as state 2 because each input port 72 or 74 is connected to only one output port 78 or 80; and state 4 is the mirror of state 3 because one input port 72 or 74 is decoupled from one output port 78 or 80 while the other input port 72 or 74 is coupled to two output ports 78 and 80. The fundamental mechanism is: The variation induced in the multiplexer section 58 when in states 2 or 1 (i.e., when coupling the signal at one input port to one output port) rather than in states 4 or 3 (i.e., when coupling the signal at the input port to two output ports) is offset by a corresponding change in the $S_{11}$ reflection coefficient sufficient enough to offset the inherent gain/power differences.

Figure 7:
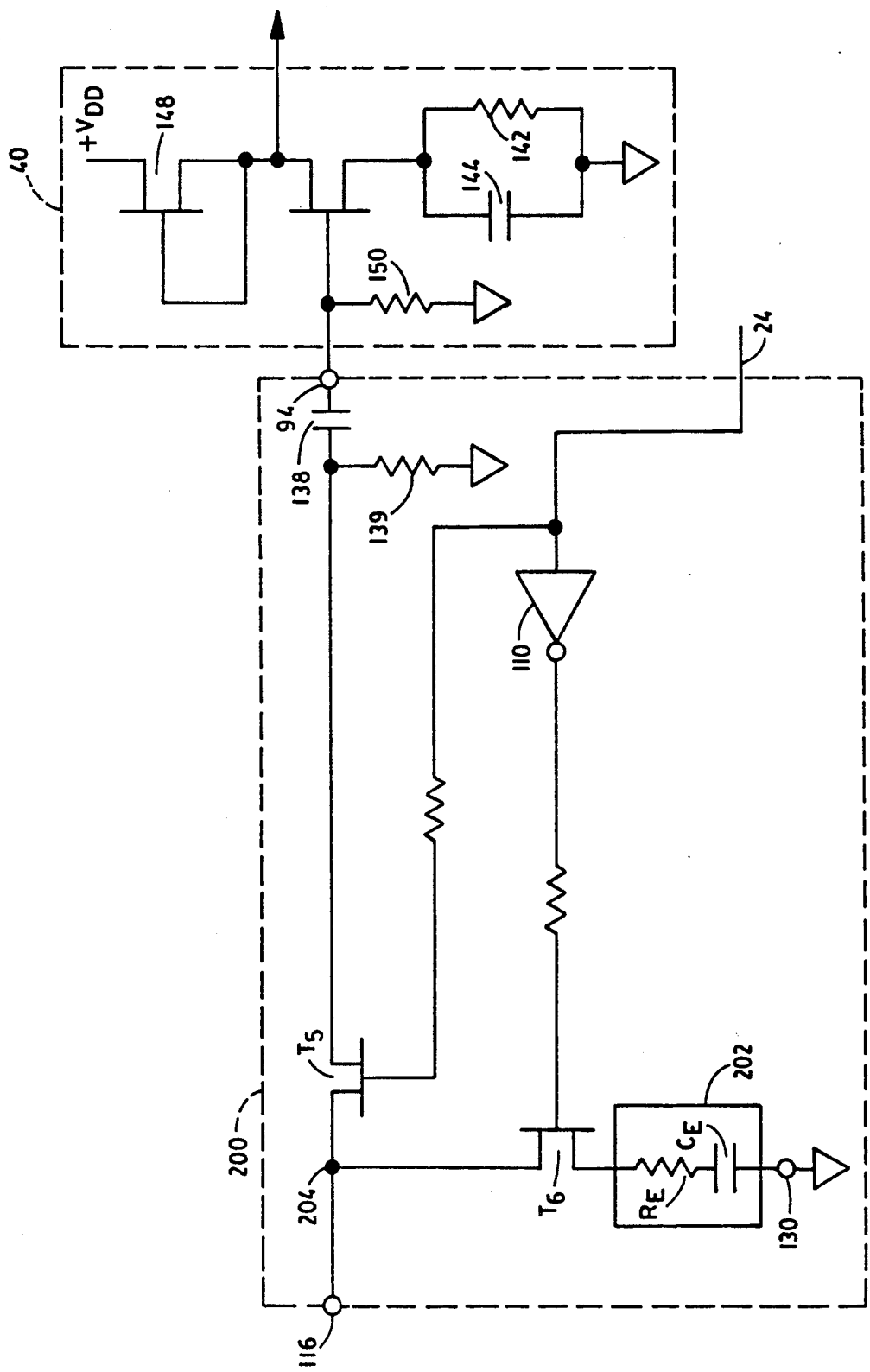

Referring now to FIG. 7, an alternative switching network 200 may be used in place of each one of the switching networks 102, 104, 106, 108. Here, switching network 200 is here shown in place of switching network 104. Thus, here an impedance network 202 is connected between transistor $T_6$ and ground, as shown. (In the case of switching networks 102, 106, and 108, a corresponding impedance network would be connected between transistors $T_3$, $T_3'$, and $T_6'$, respectively, and ground). Transistor $T_5$ is coupled serially between input terminal 116 and output terminal 94. Transistor $T_6$ is serially coupled between input terminal 116 and ground via resistor $R_E$ and capacitor $C_E$. Transistor $T_6$ and transistor $T_5$ are connected together at a junction 204. The impedance of network 202 is selected to be equal to the input impedance of IF amplifier 40, described above in connection with FIGS. 5 and 5A. Here, referring to FIG. 5A, the network 202 is a resistor $R_E$ in series with a capacitor $C_E$. Thus, when transistor $T_6$ is in a non-conducting condition and transistor $T_5$ is in a conducting condition, the parallel combined impedance from junction 204 to ground through both transistor $T_5$ and transistor $T_6$ will be the same as when transistor $T_6$ is in a conducting condition and transistor $T_5$ is in a non-conducting condition. (It is noted that transistor $T_4$ (as well $T_1$, $T_1'$, $T_4'$) is not included in this embodiment).

Having described a preferred embodiment of the invention it will now be apparent to one of skill in the art that other embodiments incorporating its concepts may be used. It is felt, therefore, that this invention should not be restricted to the preferred embodiment but rather should be limited only by the spirit and scope of the appended claims.

What is claimed is:

1. A switchable, dual channel frequency converter, comprising:
   a semiconductor body having formed as a monolithic microwave integrated circuit: a pair of input signal channels; a pair of output signal channels; and, a mixer and multiplexer means, disposed between the pair of input signal channels and the pair of output signal channels, for converting the frequency of signals fed to the pair of input signal channels to a different frequency and for directing the frequency converted signals to the pair of output signal channels selectively in accordance with a control signal;
   wherein the mixer and multiplexer means includes:
   a pair of mixers, each one being coupled to a corresponding one of the pair of input signal channels and a common local oscillator signal; and,
   a pair of multiplexers, each one being coupled to an output of a corresponding one of the mixers; and
   wherein each one of the pair of multiplexers is responsive to a control signal and includes a pair of inputs and an output, the pair of inputs of each one of the multiplexers being coupled to the outputs of the pair of mixers, the outputs of the pair of multiplexers being coupled to the pair of output signal channels and, wherein:
   when the control signal is in a first state, a first one of the pair of input channels is coupled to a first one of the pair of output channels through a first one of the pair of mixers and a first one of the pair of multiplexers, while a second one of the pair of input channels is coupled to a second one of the pair of output channels through a second one of the pair of mixers and a second one of the pair of multiplexers;
   when the control signal is in a second state the first one of input channels is coupled to the second one of the pair of output channels through the first one of the pair of mixers and the second one of the pair of multiplexers, while the second one of the pair of input channels is coupled to a first one of the pair of output channels through a second one of the pair of mixers and a first one of the pair of multiplexers;
   when the control signal is in a third state, the first one of the pair of input channels is coupled to the first one of the pair of output channels through the first one of the pair of mixers and the first one of the pair of multiplexers and is also coupled to the second one of the pair of output channels through the first one of the pair of mixers and the second one of the pair of multiplexers, while the second one of the pair of input channels is decoupled from both the first and second output channels; and,
   when the control signal is in a fourth state, the first one of the pair of input channels is decoupled from both the first and second output channels, while the second one of the pair of input channels is coupled to the first one of the pair of output channels through the second one of the pair of mixers and the first one of the pair of multiplexers and is also coupled to the second one of the pair of signal channels through the second one of the pair of mixers and the second one of the multiplexers.

2. The converter recited in claim 1 wherein each one of the multiplexers includes a pair of transistor switching networks, such pair of switching networks having input terminals fed by the pair of input channels and a pair of output terminals connected to a common one of the pair of output channels, and wherein in each one of the four states of the control signal, when one of the pair of switching networks decouples the input terminal from ground terminal and couples it to the common output channel, the other one of the pair of switching networks decouples the input terminal from common channel couples it to ground.

3. The converter recited in claim 2 wherein the power transfer of the switching network is substantially the same independent of the state of the control signal.

4. The converter recited in claim 3 wherein each one of the transistor switching networks includes a pair of field effect transistors, one of the transistors having its source and drain electrodes coupled serially between the input terminal and the output terminal and the other one of the transistors having its source and drain electrodes serially coupled between the input terminal and the ground terminal, and wherein the gate electrodes are coupled to the control signal and, for each one of the four states of the control signal, drives one of the pair of transistors towards a conducting state and the other towards a non-conducting state.

5. The converter recited in claim 4 including a third field effect transistor, and wherein one of the source and drain electrodes of each of the pair of transistors are connected at a junction, the source and drain electrodes of the third transistor being serially connected between the junction and the output terminal.

6. The converter recited in claim 5 including a capacitor connected in shunt with the source and drain electrodes of the first mentioned transistor.

7. The converter recited in claim 5 wherein the gate electrode of the third transistor is coupled to the control signal and, in response thereto, is driven to the same conducting/non-conducting state of the first mentioned one of the pair of transistors.

8. A multiplexer system, comprising:

(a) a pair of multiplexers, each one thereof comprising: a pair of input terminals; an output terminal; and, means, responsive to a control signal, for coupling a first one of the pair of input terminals to the output terminal when the control signal is in a first state and for coupling a second one of the pair of input terminals to the output terminal when the control signal is in a second state; and, (b) wherein in each one of the two states of the control signal, when one of the pair of switching networks decouples the input terminal from ground terminal and couples it to the common output channel, the other one of the pair of switching networks decouples the input terminal from common channel couples it to ground; and (c) wherein the power transfer of the pair of switching network is substantially equal independent of the state of the control signal; and (d) wherein each one of the transistor switching networks includes a pair of field effect transistors, a first one of the pair of transistors having its source and drain electrodes coupled serially between the input terminal and the output terminal and the other one of the pair of transistors having its source and drain electrodes serially coupled between the input terminal and the ground terminal, and wherein the gate electrodes are coupled to the control signal and, for each one of the four states of the control signal, drives one of the pair of transistors towards a conducting state and the other towards a non-conducting state; and (e) including a third field effect transistor, and wherein one of the source and drain electrodes of each of the pair of transistors are connected at a junction, the source and drain electrodes of the third transistor being serially connected between the junction and the output of the multiplexer system.

9. The multiplexer recited in claim 8 including a capacitor connected in shunt between the source and drain electrodes of the first one of the pair of transistors.

10. The multiplexer system recited in claim 8 wherein the gate electrode of the third transistor is coupled to the control signal and, in response thereto, is driven to the same conducting/non-conducting state of the first one of the pair of transistors.

11. A monolithic microwave integrated circuit, comprising:

a pair of input signal channels;

a pair of output signal channels; and, a mixer and multiplexer means, disposed between the pair of input signal channels and the pair of output signal channels, for converting the frequency of signals fed to the pair of input signal channels to a different frequency and for directing the frequency converted signals to the pair of output signal channels selectively in accordance with a control signal, the mixer and multiplexer means includes: a pair of mixers coupled to the pair of input signal channels and a common local oscillator signal; and a multiplexer network, the mixers converting the radio frequency of the signals in the pair of input signal channels into a corresponding pair of intermediate frequency signal channels, the multiplexer network includes: a pair of input ports fed by the pair of intermediate frequency signal channels and a pair of output ports which feed the pair of output signal channels; a control signal being fed to the multiplexer network, when the control signal is in a first state, a first one of the pair of intermediate frequency signal channels is coupled to a first one of the pair of output channels, while a second one of the pair of intermediate frequency signal channels is coupled to a second one of the pair of output channels, when the control signal is in a second state, the first one of the pair of intermediate frequency signal channels is coupled to the second output channel, while the second intermediate frequency signal channel is coupled to the first output channel, when the control signal is in third state, the first intermediate frequency signal channel is coupled to the first output channel and is also coupled to the second output channel, while the second input channel is decoupled from both the first and second output channels, and when the control signal is in a fourth state, the first intermediate frequency signal channel is decoupled from both the first and second output channels, while the second intermediate frequency signal channel is coupled to the first output channel and is also coupled to the second output signal channel.

12. The integrated circuit recited in claim 11 wherein the power transfer of the intermediate frequency signals through the multiplexer network to the output signal channels is substantially the same in all four states of the control signal.

13. The integrated circuit recited in claim 12 wherein the power transfer of the intermediate frequency signals through the multiplexer network to the output signal channels differ by less than 0.5 db in all four states of the control signal.

* * * * *